(12) United States Patent
Schwartz

(10) Patent No.: US 9,921,900 B1
(45) Date of Patent: Mar. 20, 2018

(54) METHODS AND APPARATUS FOR SYSTEM MONITORING

(71) Applicant: VividCortex, Inc., Charlottesville, VA (US)

(72) Inventor: Baron Schwartz, Charlottesville, VA (US)

(73) Assignee: VIVIDCORTEX.INC., Charlottesville, VA (US)

( * ) Notice: Subject to any disclaimer, the term of this patent is extended or adjusted under 35 U.S.C. 154(b) by 449 days.

(21) Appl. No.: 14/633,742

(22) Filed: Feb. 27, 2015

Related U.S. Application Data

(60) Provisional application No. 61/946,385, filed on Feb. 28, 2014.

(51) Int. Cl.
| | |
|---|---|
| *G06F 11/07* | (2006.01) |
| *G06F 9/48* | (2006.01) |
| *G06N 99/00* | (2010.01) |

(52) U.S. Cl.
CPC ........ *G06F 11/0769* (2013.01); *G06F 9/4881* (2013.01); *G06N 99/005* (2013.01)

(58) Field of Classification Search
CPC .. G06F 11/0769; G06F 9/4881; G06N 99/005
See application file for complete search history.

(56) References Cited

U.S. PATENT DOCUMENTS

2007/0028220 A1*  2/2007  Miller ............... G05B 23/0278
                                            717/124

* cited by examiner

*Primary Examiner* — Kyoung Lee
(74) *Attorney, Agent, or Firm* — Edell, Shapiro & Finnan LLC

(57) ABSTRACT

An apparatus includes a data collection module configured to receive a first observation value for a first variable. The first observation value is associated with a performance parameter of a processing system and with a time period. The data collection module is further configured to receive a set of second observations values for a second variable. The set of second observation values is associated with the processing of a set of tasks by the processing system. The compute module is further configured to estimate a contribution, to the first observation value, of a second observation value of the set of second observation values associated with tasks executing during the time period. The estimating the contribution includes computing an estimated error associated with the contribution. The apparatus further includes a interface module configured to transmit an indication of the contribution and an indication of the estimated error to a user interface.

17 Claims, 12 Drawing Sheets

METHODS AND APPARATUS FOR SYSTEM MONITORING

CROSS-REFERENCE TO RELATED APPLICATIONS

This application claims priority to U.S. provisional application No. 61/946,385 titled "METHODS AND APPARATUS FOR DEVICE MONITORING", filed Feb. 28, 2014, the entire disclosure of which is incorporated herein by reference in its entirety.

BACKGROUND

Administrators are often interested in measuring the resources a task, such as a statement or database query, consumes. For example, administrators like to know how much central processing unit (CPU) time a query uses. If a server's CPU utilization is high, administrators would like to know which queries use the most CPU time. Query resource consumption is not possible to measure directly in many cases.

Described with reference to the example above, such a problem can be more generally expressed as follows: given many samples of several independent variables $x_1 \ldots x_n$ and a single dependent variable y observed from a system (such as a database server), coefficients $c_1 \ldots c_n$ can be calculated such that the equation $y=c_1x_1+ \ldots +c_nx_n$ describes the system's observed behavior as closely as possible. Each independent x variable is a query/task class's execution time, and y is the observed CPU time or other metric of interest. A coefficient for each class of queries can then be computed. When multiplied by each sample of the query class's accumulated execution time, a value for that query class's CPU time can be obtained. When summed together, these values should approximate as closely as possible the observed CPU time.

However, such an attempt at describing the problem can be a simplification of linear regression. Linear regression attempts to fit a hyperplane through a multidimensional sample space while minimizing the sum of squared errors. The equation that describes the hyperplane is similar to the equation $y=c_1x_1+ \ldots +c_nx_n$. Each dimension of the hyperplane is described by a slope, and there is a single intercept. The simplest case of a hyperplane with only one independent variable is a line described by the equation $y=ax+b$, where a is the slope of the line and b is the y-intercept. Linear regression fits the equation to the sample data and produces a slope and intercept for each dimension, along with an estimated standard error for the slope and intercept.

For example, the result of a simple least-squares linear regression against the values in Table 1 is the equation $y=4.032x+31.602$. The dataset and this line can be seen in FIG. 1.

TABLE 1

Sample dataset to illustrate regression

| x | y |
|---|---|
| 12 | 93 |
| 1 | 45 |
| 18 | 76 |
| 23 | 145 |
| 9 | 53 |

When, however, multiple independent variables are present, an assumption can be made that a cause-and-effect relationship between the variables may exist, and that some of the independent variables may not directly influence the dependent variable. To compensate for this assumption, multiple linear regression examines not only the correlation between the independent variables and the dependent variable, but also that of each pair of independent variables. The number of correlations computed in multiple linear regression is thus $n(n-1)$, which is $O(n^2)$ in the number of independent variables. In other words, multiple linear regression is computationally expensive with a large number of variables (classes of queries). But the reality of queries executing in a database server is that each query consumes its own CPU time, because a query is a program with CPU instructions.

Multiple linear regression also tends to produce poor results on large numbers of independent variables, because independent variables with large contributions to the dependent variable are more statistically significant than minority contributors. In fact, the few most significant independent variables usually explain most of the results, and trying to include all independent variables in the computation typically produces a "worse fit" than discarding all but the top few.

It is also common for some classes of tasks to consume resources more or less constantly, and for occasional resource-intensive tasks to dominate. Administrators do not want results to be rendered useless by such inevitable outliers. This observation about a drawback of multiple linear regression: each independent variable is assessed in terms of its contribution to the dependent variable. That is, linear regression computes the likely relationship between each x value and the resulting y value. The underlying mechanism of regression is that correlations between independent and dependent variables (i.e., coincidences) are likely to be meaningful; the method essentially treats correlation as causation, adjusting coefficients to find a best-fit given the presence of inputs that support or reject this hypothesis.

Accordingly, a need exists for devices and apparatuses for system monitoring that more accurately estimate performance of a processing system executing one or more tasks.

SUMMARY

An apparatus includes a data collection module configured to receive a first observation value for a first variable. The first observation value is associated with a performance parameter of a processing system and with a time period. The data collection module is further configured to receive a set of second observations values for a second variable. The set of second observation values is associated with the processing of a set of tasks by the processing system. The apparatus further includes a compute module operatively coupled to the data collection module, the compute module configured to compute a set of third values indicative of a performance of the processing system for processing the tasks executing during the time period. The compute module is further configured to estimate a contribution, to the first observation value, of a second observation value of the set of second observation values associated with tasks executing during the time period. The estimating the contribution includes computing an estimated error associated with the contribution. The apparatus further includes an interface module operatively coupled to the compute module, the interface module configured to transmit an indication of the contribution and an indication of the estimated error to a user interface.

DETAILED DESCRIPTION

In some embodiments, a method includes receiving, from a processing system, a first observation value for a first variable. The first observation value is associated with a performance parameter of the processing system. The method further includes receiving a set of second observations values for a second variable. The set of second observation values is associated with the processing of a set of tasks by the processing system. The method further includes computing based on the first observation value and the set of second observation values, a set of third values indicative of a performance of the processing system for processing the set of tasks. The method further includes estimating, based on the set of third values and the set of second observation values, a contribution, to the first observation value, of a second observation value of the set of second observation values. The estimating further includes computing an estimated error associated with the contribution. The method further includes transmitting an indication of the contribution and the estimated error.

Figure 2A:
FIG. 2 is an illustration of a device for system monitoring, according to an embodiment.
Figure 2B:

FIG. 2 is a schematic diagram that illustrates a device/apparatus 200 configured to observe operation of a processing system 290 (sometimes referred to as a processor system, and/or a host device). It is understood that the processing system 290 can be any suitable entity being observed including, but not limited to, another device, apparatus, system, process, a thread executing within a process, and/or the like, including any sub-component (e.g., a sub-system) thereof. The observed operation(s) can be any operational aspect of the processing system 290, such as throughput, concurrency, consistency, task execution time, CPU time, combinations thereof, and/or the like.

The processing system 290 can be any device configured to host a system or execute a process that executes tasks in a manner that generates observable characteristics, such as, for example, execution time. The processing system 290 can be, for example, a server, a compute device, a router, a data storage device, and/or the like. The system or process associated with the processing system 290 can include, for example, computer software (stored in and/or executed at hardware) such as web application, database application, cache server application, queue server application, application programming interface (API) application, operating system, file system, etc.; computer hardware such as network appliance, storage device (e.g., disk drive, memory module), processing device (e.g., computer central processing unit (CPU)), computer graphic processing unit (GPU)), networking device (e.g., network interface card), etc.; and/or combinations of computer software and hardware (e.g., assembly line, automatic manufacturing process). In some embodiments, although not shown in FIG. 2, the device 200 can be operatively coupled to more than one host device or other devices, such that the device 200 can substantially simultaneously monitor more than one system and/or process according to embodiments described herein.

Figure 1:
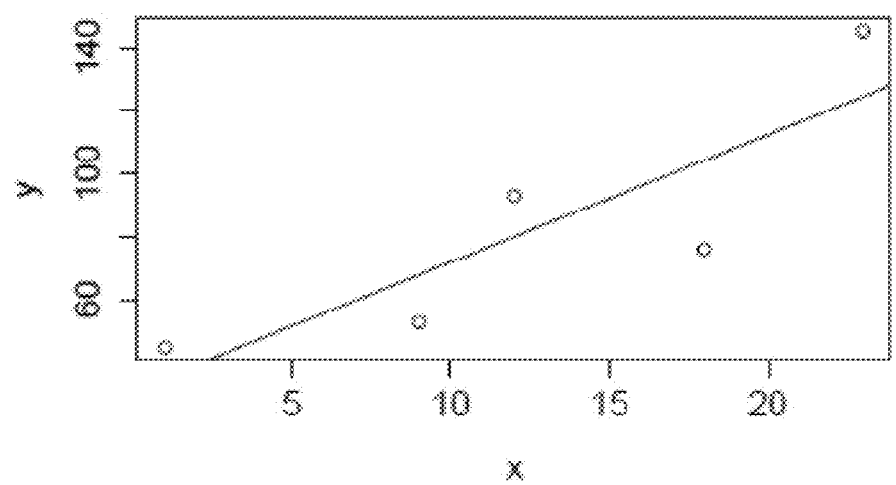
FIG. 1 is a plot illustrating an example of simple linear regression.

The device 200 can be any device with certain data processing and computing capabilities such as, for example, a server, a workstation, a compute device, a tablet, a mobile device, and/or the like. As shown in FIG. 2, the device 200 includes a memory 280, a processor 210, and/or other component(s) (not shown in FIG. 2). The memory 280 can be, for example, a Random-Access Memory (RAM) (e.g., a dynamic RAM, a static RAM), a flash memory, a removable memory, and/or so forth. In some embodiments, instructions associated with performing the operations described herein (e.g., estimating a contribution) can be stored within the memory 280 and executed at the processor 210. The processor 210 includes a data collection module 230, a compute module 240, a user interface module 250, a training module 260, and/or other module(s) (not shown in FIG. 1). The device 200 can be operated and controlled by a user A such as, for example, an operator, an administrator, and/or the like. In some embodiments, the device 200 can be configured for fault detection as described in U.S. application Ser. No. 14/200,746 titled "METHODS AND APPARATUS FOR FAULT DETECTION", filed Mar. 7, 2014, the entire disclosure of which is incorporated herein by reference in its entirety.

Each module in the processor 210 can be any combination of hardware-based module (e.g., a field-programmable gate array (FPGA), an application specific integrated circuit (ASIC), a digital signal processor (DSP)), software-based module (e.g., a module of computer code stored in the memory 280 and/or executed at the processor 210), and/or a combination of hardware- and software-based modules. Each module in the processor 210 is capable of performing one or more specific functions/operations as described herein (e.g., associated with a calculating operation), as described in further detail with respect to FIGS. 2-12. In some embodiments, the modules included and executed in the processor 210 can be, for example, a process, application, virtual machine, and/or some other hardware or software module (stored in memory and/or executing in hardware). The processor 210 can be any suitable processor configured to run and/or execute those modules.

In some embodiments, the processor 210 can include more or less modules than those shown in FIG. 2. For example, the processor 210 can include more than one compute module to simultaneously perform multiple computing tasks for multiple systems and/or processes. In some embodiments, the device 200 can include more components than those shown in FIG. 2. For example, the device 200 can include a communication interface (e.g., a data port, a wireless transceiver and an antenna) to enable data transmission between the detection device 200 and the processing system 290. In some embodiments, the device 200 can include or be coupled to a display device (e.g., a printer, a monitor, a speaker, etc.), such that an output of the detection device (e.g., an indication of a contribution) can be presented to the user A via the display device.

As used herein, a module can be, for example, any assembly and/or set of operatively-coupled electrical components associated with performing a specific function, and can include, for example, a memory, a processor, electrical traces, optical connectors, hardware executing software and/or the like. As used herein, the singular forms "a," "an" and "the" include plural referents unless the context clearly dictates otherwise. Thus, for example, the term "a compute module" is intended to mean a single module or a combination of modules configured to execute computing tasks associated with system monitoring.

In some embodiments, as shown in FIG. 2, the device 200 can be operatively coupled to the processing system 290 via, for example, a network 220. The network 220 can be any type of network that can operatively connect and enable data transmission between the device 200 and the processing system 290. The network 220 can be, for example, a wired network (an Ethernet, local area network (LAN), etc.), a wireless network (e.g., a wireless local area network (WLAN), a Wi-Fi network, etc.), or a combination of wired and wireless networks (e.g., the Internet, etc.). For example, the device 200 can be a server placed at a centralized location in a data center and connected, via a LAN, to multiple processing systems (similar or identical to the processing system 290) that are distributed within the data center. Each host device can host and maintain a system (e.g., a file system), and/or execute a process (e.g., a web service). In such a deployment, the device 200 can monitor the operation of the multiple processing systems, such as for monitoring performance of the host devices in executing a set of tasks. In some other embodiments, the device 200 can be physically connected to the processing system 290. In yet other embodiments, the functionalities of the device 200 can be implemented within the processing system 290.

The operation of the various modules is explained herein with reference to a single variable of a single operation on the processing system 290 for simplicity, though it is understood that unless explicitly stated otherwise, aspects of the modules described herein are extendible to multiple variables, to multiple operations, and/or to multiple devices.

The data collection module 230 can receive, from the processing system 290, a first observation value for a first variable. In some embodiments, the data collection module 230 can receive a set of first observation values for the first variable.

The first variable can be any suitable qualitative and/or quantitative measure of the performance of the processing system 290 that can be of interest when the processing system executes a set of tasks. For example, the performance parameter can be CPU time, CPU usage, memory usage, I/O usage, hard disk usage, any parameter derived therefrom, and/or the like. As another example, in database systems, the performance parameter can be any internal metric(s) such as number of rows read, bytes sorted, index updates, cache hits, cache misses, locks waited for, and/or the like.

In some embodiments, the first observation value is associated with a time period and/or time window such as, for example, six hours, a day, a week, a month, and/or the like. In some embodiments, the set of first observation values are associated with the time period such as when, for example, the first variable is sampled multiple times during the time period.

The data collection module 230 can further receive a set of second observations values for a second variable such as from, for example, the processing system 290, another module of the device 200, and/or the like. In some embodiments, the data collection module 230 can receive a set of second observation values associated with a first observation value of the set of first observation values. In some embodiments, the data collection module 230 can identify, from a set of second observation values, which second observation values are associated with a particular first observation value based on, for example, timing and/or timestamp information. For example, a second observation value can be considered to be associated with a first observation value if it was generated/measured at the same time as, or before, the first observation value. As another example, a second observation value can be considered to be associated with a first observation value if it is associated with a task executing at the time the first observation value was generated/measured.

The second variable can be, for example, any suitable measure of execution/processing of one or more tasks by the processing system 290. For example, when the task is a database query/a group of database queries, the second variable can be the response time, throughput, concurrency, execution count, service demand, error rate, derived metrics such as count of queries not using indexes, and/or the like, for the query/group of queries.

In some embodiments, the second observation values can be calculated using task-related information, system information, and/or the like, by the data collection module 230. In the example where the task is a database query, the second observation values can be calculated using timestamp information in a roundtrip packet, system times at the beginning and end of task processing, and/or the like. In some embodiments, each first observation value and each second observation value are measures of the same quantity (e.g., measures of time, measures of usage, and/or the like), and have the same dimensions (e.g., seconds, percentage, and/or the like).

The compute module 240 can receive the first observation value and the set of second observation values from the data collection module 230. In some embodiments, the compute module 240 can determine the set of second observation values that are associated with tasks executing during the time period corresponding to the first observation value. In this manner, tasks that are not being processed by the processing system 290 during the time period can be ignored, removed and/or generally not accounted for when estimating the contribution of the set of second observation values to the first observation value, described in greater detail herein.

The compute module 240 can further compute, based on (1) the first observation value and (2) the set of second observation values associated with tasks executing during the time period, a coefficient associated with the second variable. In some embodiments, the compute module can calculate a coefficient for each first observation value of the set of first observation values based on (1) the first observation value and (2) its associated set of second observation values. In such embodiments, multiple coefficients can be computed, one for each first observation value.

In some embodiments, calculating the coefficient including summing and/or otherwise aggregating the set of second observation values associated with tasks executing during the time period to obtain a sum of second observation values, and dividing the first observation value by the sum of second observation values to obtain the coefficient. In some embodiments, the compute module 240 can further calculate the coefficient if both the first observation value and the sum of second observation values is non-zero. The value of the coefficient can be indicative of the performance of the processing system 290 (as specified by the (first observation value) per unit of processing accomplished (as specified by the second observation values).

The compute module 140 can further compute, based on (1) the first observation value and (2) the second observation values associated with tasks executing during the time period, a set of third values for the tasks executing in the time period. In some embodiments, the compute module can calculate a set of third values for each first observation value of the set of first observation values based on (1) the first observation value and (2) the second observation values associated with the first observation value, and further associated with tasks executing during the time period. In such embodiments, multiple sets of third values can be computed, one for each first observation value.

In some embodiments, the set of third values can be computed by computing the coefficient as described above, and further by multiplying the coefficient with each second observation value of the set of second observation values associated with tasks executing during the time periods. Each second observation value associated with tasks executing during the time period now has a corresponding third value (i.e., a second observation value-third value pair), and each third value can be indicative of a performance of the processing system for processing the task(s) associated with its corresponding second observation value.

The compute module 140 can further estimate, based on (1) each third value and (2) its corresponding second observation value, a contribution, to the first observation value, of the second observation value, and by association, of the task(s) associated with the second observation value. In some embodiments, the compute module 140 can perform the estimation by performing a statistical analysis to identify a relationship between the third value and its corresponding second observation value. In some embodiments, where the first observation value is one of a set of first observation values, the compute module 140 can estimate the contribution of a second observation value based on multiple sets of third value-second observation value pairs, each set of third value-second observation value pairs associated with one of the first observation values.

In some embodiments, the statistical analysis can include, but is not limited to, simple linear regression, exponential regression, polynomial regression, Bayesian analysis, principal component analysis, wavelet transform analysis, autoregressive integrated moving average (ARIMA) analysis, maximum likelihood estimation (MLE) analysis, stochastic frontier analysis, correlation analysis, analysis of variance (ANOVA), combinations thereof, and/or the like. In some embodiments, the contribution includes a specification of a slope, or an intercept, or both, such as when, for example, the statistical analysis includes regression.

The compute module 140 can further estimate the contribution by computing an estimated error associated with the contribution. In some embodiments, the estimated error includes a specification of an estimated error for the slope, or an estimated error for the intercept, or both. In some embodiments, the estimated error includes a specification of a mean absolute percentage error (MAPE), t-statistic, F-statistic, residual error (e.g., r-squared), and/or the like.

In some embodiments, each second observation value is associated with a subset of the tasks. For example, if each task is a database query, then a subset of tasks can be a class of related queries, and the associated second observation value can be the response time for executing the class of related queries. In such embodiments, the compute module 240 can be further configured to divide the contribution by the number of tasks in the subset of tasks to calculate a per task contribution to the first observation value of the subset of tasks.

The user interface module 250 can transmit an indication of the contribution and/or an indication of the estimated error to a user interface, such as, for example, to a visual display associated with the device 200, or to another module. The indication of the contribution and/or an indication of the estimated error can be presented to a user (e.g., the user A) in any suitable form including, but not limited to, alphanumeric, video, graphic, audio, and/or the like. For example, a plot of the regression between the third value and the corresponding second observation value, along with the contribution and/or an indication of the estimated error, can be presented.

The training module 260 can train the compute module 240 by any suitable approach such as, for example, supervised training, unsupervised training, and/or the like. In some embodiments, the training module 260 can train the compute module 240 by producing estimated results for a first data set and assessing the quality of the results to indicate the likely quality of results for other data sets. In some embodiments, a training data set is employed to train the compute module 240. In other embodiments, a portion of the second observation values, such as, for example, a training set of second observation values, is used to train the compute module 240. The compute module 240 can be then used to estimate contribution of either the training set, or another set of second observation values, from the processing system 290.

Figure 3:
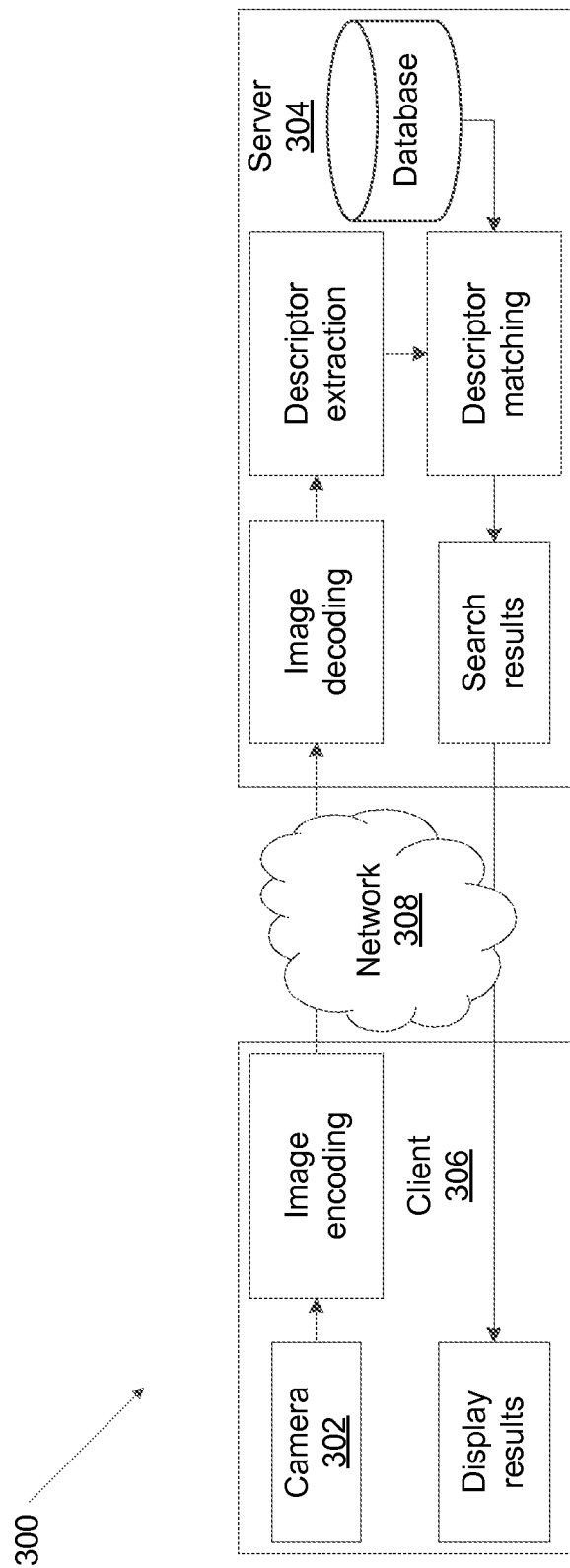
FIG. 3 is a flowchart illustrating a method of system monitoring, according to an embodiment.

FIG. 3 illustrates a method 300, according to an embodiment. In some embodiments, the method 300 can be performed by the device 200 of FIG. 2. At 310, the method includes receiving, from a processor system, a first observation value for a first variable. For example, the data collection module 230 can receive the first observation value from the processing system 290. In some embodiments, step 310 includes receiving a set of first observation values for the first variable. In some embodiments, the first observation value is associated with performance of the processing system.

At 320, the method 300 includes receiving a set of second observations values for a second variable. For example, the data collection module 230 can receive the set of second observations values, such as from the processing system 290, from another module, and/or the like. The set of second observation values is associated with the processing of a set of tasks by the processor system. In some embodiments, step 320 includes receiving a set of second observation values associated with a first observation value of the set of first observation values. In some embodiments, step 320 includes identifying, from a set of second observation values, which second observation values are associated with a particular first observation value based on, for example, timing and/or timestamp information. For example, a second observation value can be considered to be associated with a first observation value if it was generated/measured at the same time as, or before, the first observation value. As another example, a second observation value can be considered to be associated with a first observation value if it is associated with a task executing at the time the first observation value was generated/measured.

In some embodiments, the first observation value and each second observation value are measures of a common quantity; said another way, the first observation value and each second observation value have the same dimensions/units, such as, for example, units of time (seconds, minutes, etc.), units of usage (number of processor cycles, percentage CPU time, etc.), and/or the like. In some embodiments, for example, the first observation value is an indication of processing time, and each second observation is an indication of response time.

At 330, the method 300 includes computing, based on (1) the first observation value and (2) the set of second observation values, a set of third values. For example, the compute module 240 computes the set of third values based on the first observation value and the set of second observation values. The set of third values is indicative of a performance of the processing system for processing the set of tasks. In some embodiments, the computing can include calculating a set of third values for each first observation value of the set of first observation values based on (1) the first observation value and (2) the second observation values associated with the first observation value, and further associated with tasks executing during the time period. In such embodiments, multiple sets of third values can be computed, one for each first observation value.

In some embodiments, the computing the set of third values includes computing, based on (1) the first observation value and (2) the set of second observation values, a coefficient associated with the second variable. In some embodiments, the computing the set of third values further includes multiplying the coefficient with each second observation value of the set of second observation values to generate the set of third values. In some embodiments, the computing the set of third values calculating a coefficient for each first observation value of the set of first observation values based on (1) the first observation value and (2) its associated set of second observation values. In such embodiments, multiple coefficients can be computed, one for each first observation value.

At 340, the method 300 includes estimating a contribution to the first observation value of a second observation value of the set of second observation values. For example, the compute module 240 estimates the contribution of the second observation value of the set of second observation values to the first observation value. In some embodiments, the estimating is based on the set of third values and the set of second observation values. In some embodiments, where the first observation value is one of a set of first observation values, the compute module 140 can estimate the contribution of a second observation value based on multiple sets of third value-second observation value pairs, each set of third value-second observation value pairs associated with one of the first observation values.

In some embodiments, the estimating includes computing an estimated/standard error associated with the contribution such as, for example, mean absolute percentage error (MAPE), t-statistic, F-statistic, residual error (r-squared), and/or the like. In some embodiments, the estimating the contribution includes performing a statistical analyses for identifying a relationship between the set of third values and the set of second observation values. In some embodiments, the statistical analysis includes linear regression. In some embodiments, the statistical analysis includes simple linear regression.

In some embodiments, the first observation value is one of a set of first observation values received at step 310, and the step 340 is performed after steps 310-330 are performed for each first observation value. In this manner, the contribution can be estimated and (in some embodiments) the estimated/standard error can be computed to account for the multiple sets of third value-second observation value pairs that collectively describe the performance of the processing system.

In some embodiments, the (each) first observation value is associated with a time period. In such embodiments, the computing the set of third values at step 330 can be based on the set of second observation values associated with tasks of the set of tasks executing during the time period. In some embodiments, the estimating of step 340 can be based on the set of third values and the set of second observation values associated with the set of tasks executing during the time period.

At 350, the method 300 includes transmitting an indication of the contribution and the estimated error, such as, for example, to a user interface. In some embodiments, the transmitting at step 350 can include transmitting a visual representation of the contribution and the estimated error to a user interface.

In some embodiments, each second observation value associated with a subset of tasks of the set of tasks. In such embodiments, the contribution is indicative of the performance of the processing system in processing the subset of tasks. In some embodiments, the method 300 further includes calculating a per task contribution to the first observation value of the subset of tasks.

In some embodiments, the set of second observation values includes a training set of second observation values. In such embodiments, the method 300 can further include training the compute module on the training set of second observation values.

Some embodiments described herein produce telemetry/telemetering information (e.g., second observation values) such as response time and/or throughput for each class of query (e.g., each set of tasks) that is executed in a relational database management system (RDBMS; hereafter called a database server). In some embodiments, queries can be classified by removing text that tends to vary, such as whitespace and literal values. The response time and/or throughput are accumulated and sampled once every second. The result is a collection of time-series metrics for each query, such as system time/execution time/response time for the query (e.g., see description of XVAR in FIG. 12, also referred to as x-variable, as a dependent variable, and/or the like). At the same time, telemetry is generated for the server process itself (e.g., first observation value(s)), including metrics such as user and system CPU time consumed (e.g., see description of YVAR in FIG. 12, also referred to as y-variable, as an independent variable, and/or the like). Approaches disclosed herein let users such as administrators use per-query metrics (e.g., response time) to divide aggregate metrics such as user CPU time into portions (e.g., see calculation of ratio in description of FIG. 10) representative of the CPU time spent on a query and/or class of queries. The portions can be correlated to each query and/or a class of queries to estimate the contribution of the query and/or the class of queries to the CPU time. A standard/estimated error for the estimation of the portion/contribution can aid in a user's understanding of the accuracy of the estimation.

Example 1

Figure 4:
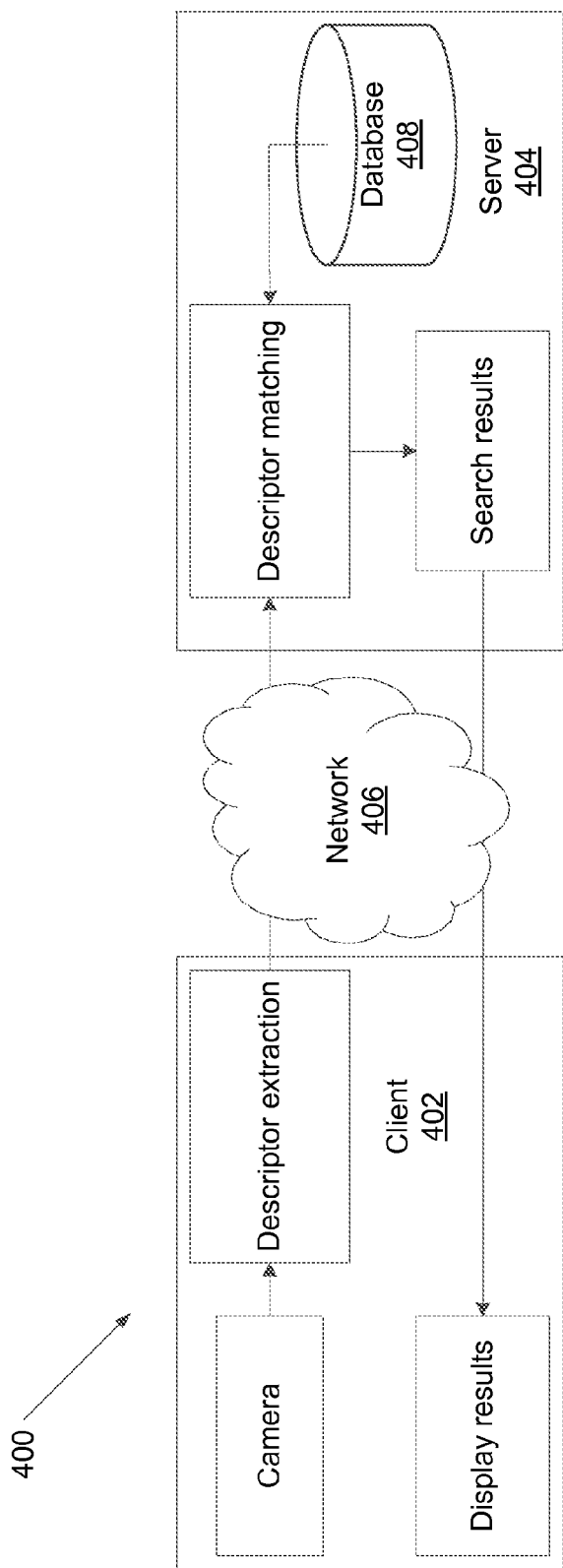
FIG. 4 is an illustration of a user interface showing computed CPU times, according to an embodiment.

FIG. 4 shows an example of a user interface concept of telemetering information available with a known approach. Such a known approach can measure the server's user CPU time overall, but not per-task or (in the example of database systems) per-query. Such an approach can display queries and their execution/system time; it would be beneficial to be able to display a column of CPU time as well, which is enabled by approaches disclosed herein. In some embodiments, the approaches amount to disaggregation of telemetry, projecting from granular metrics (e.g., system time or response time for a query) onto an aggregate metric (e.g., CPU time) and subdividing the latter to estimate contribution and/or estimated error for each of the granular metrics (e.g., see calculation of ratio in description of FIG. 12). Among the advantages of such approaches:

Reduce the amount of telemetry measured from the system under observation (e.g., the processing/processor system 290). This helps reduce the measurement intrusion effect on the system, the resources needed for the software, and the amount of data transmitted, stored, and/or analyzed. It effectively permits high-dimensional analysis on low-dimensional data by subdividing the low-dimensional data, e.g., the CPU time.

Perform ad-hoc analysis without needing to decide a priori which metrics are interesting and valuable on a per-query basis.

Compute granular metrics that are not otherwise available. RDBMSs and similar systems offer limited per-query telemetry. The MySQL database, for example, does not expose per-query CPU time metrics, nor would it be practical to build into the database server every possible metric of interest. If one assumes that the database server is the principal consumer of resources on the host machine, one can also compute per-query metrics for telemetry external to the database server, such as disk I/O metrics collected from the host's storage subsystem.

Compute metrics that are not typically implemented inside the database server. Typically, much of a query's CPU work is deferred and performed in the background, often combined with work from many other queries. Thus it is not possible to instrument fully inside the database server, even if desired. Aspects disclosed herein allow correlating of queries for otherwise undifferentiated work the server must perform.

In developing this technique, the following requirements were considered and addressed:

Low memory and CPU consumption on large datasets. Low latency is desired, so the process is interactive in resource-constrained environments such as Web browsers. It is desirable to be able to compute results for datasets consisting of millions of samples and hundreds of thousands of classes of queries, which may be sparse or dense.

Ability to compute results for entire datasets, not just one or a few classes of queries, so that answer to questions such as "which classes of query consume the most resources?" as well as "how much of a resource does query class X consume?" can be determined.

Ability to compute on-demand, without any precomputation or preparation, over arbitrary datasets.

Reasonably accurate results, supporting a way for individuals to quickly and empirically gauge quality.

Example 2

Weighted Linear Regression

After studying the techniques previously discussed, a different approach was taken that could desirably meet the following requirements:

Reasonably good accuracy;

Efficient enough to apply to very large datasets; and

Reasonable results for independent variables that appear insignificant

Working with these requirements resulted in development of technique(s) termed here as "weighted linear regression". Some simplifying but reasonable assumptions were initially made:

First, the independent variables (e.g., second variable, response time, or the XVAR) can have the same dimensions and/or meaning, such as microseconds of execution time elapsed. Additionally, the independent variables can have the same dimensions as the dependent variables (e.g., first variable), such as microseconds of CPU time elapsed. As a result, one can reasonably add, subtract, divide, and multiply them together.

Figure 10:
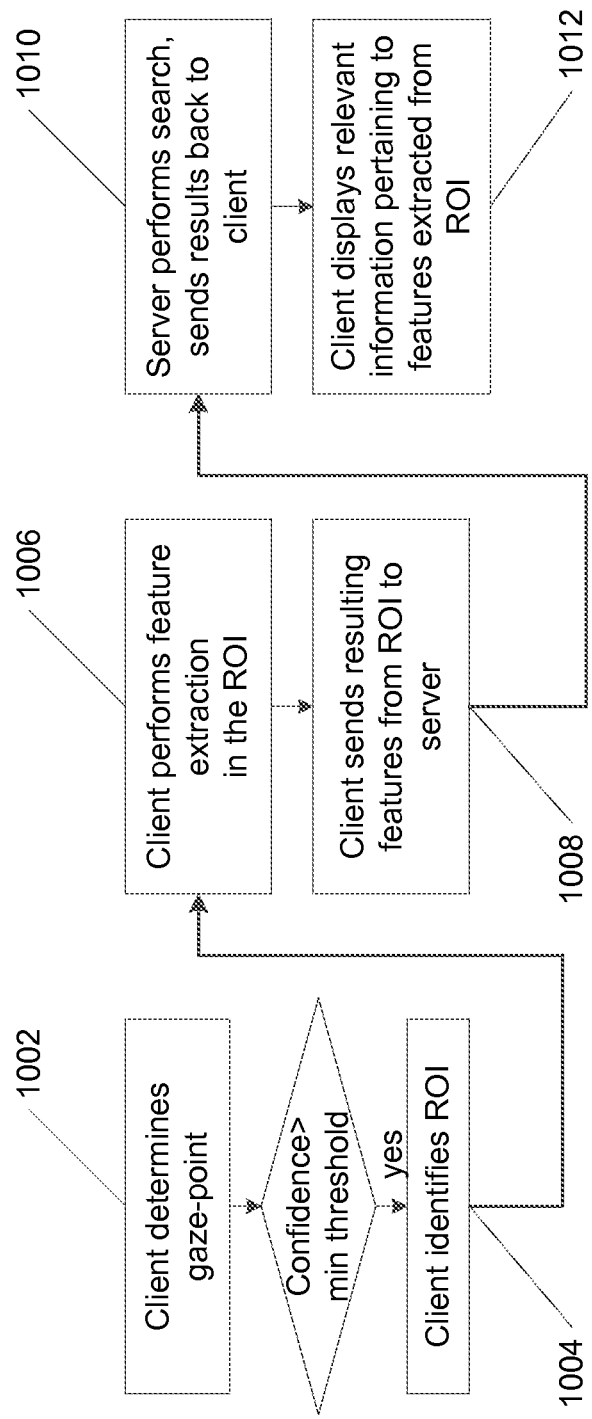
FIGS. 10A, 10B illustrate histograms of percentage residual error versus frequency for data sets test6 (FIG. 9A) and test7 (FIG. 9B), according to an embodiment.

Second, the coefficients of the x-variables (e.g., see XVAR in description of FIG. 12) are likely to be linearly related to y-variable metrics such as the server's CPU consumption (e.g., the YVAR of FIG. 10). This is justified by observing that in many cases, queries within a database server spend much of their time executing CPU instructions. It is reasonable to suggest that a query that runs twice as long as another one will be likely to execute about twice the CPU instructions.

Third, in most cases a database server that experiences no demand from queries will eventually quiesce (perhaps after finishing some deferred work) and consume no CPU time. This is equivalent to saying that queries are directly or indirectly responsible for the server's entire CPU time consumption.

Figure 5:
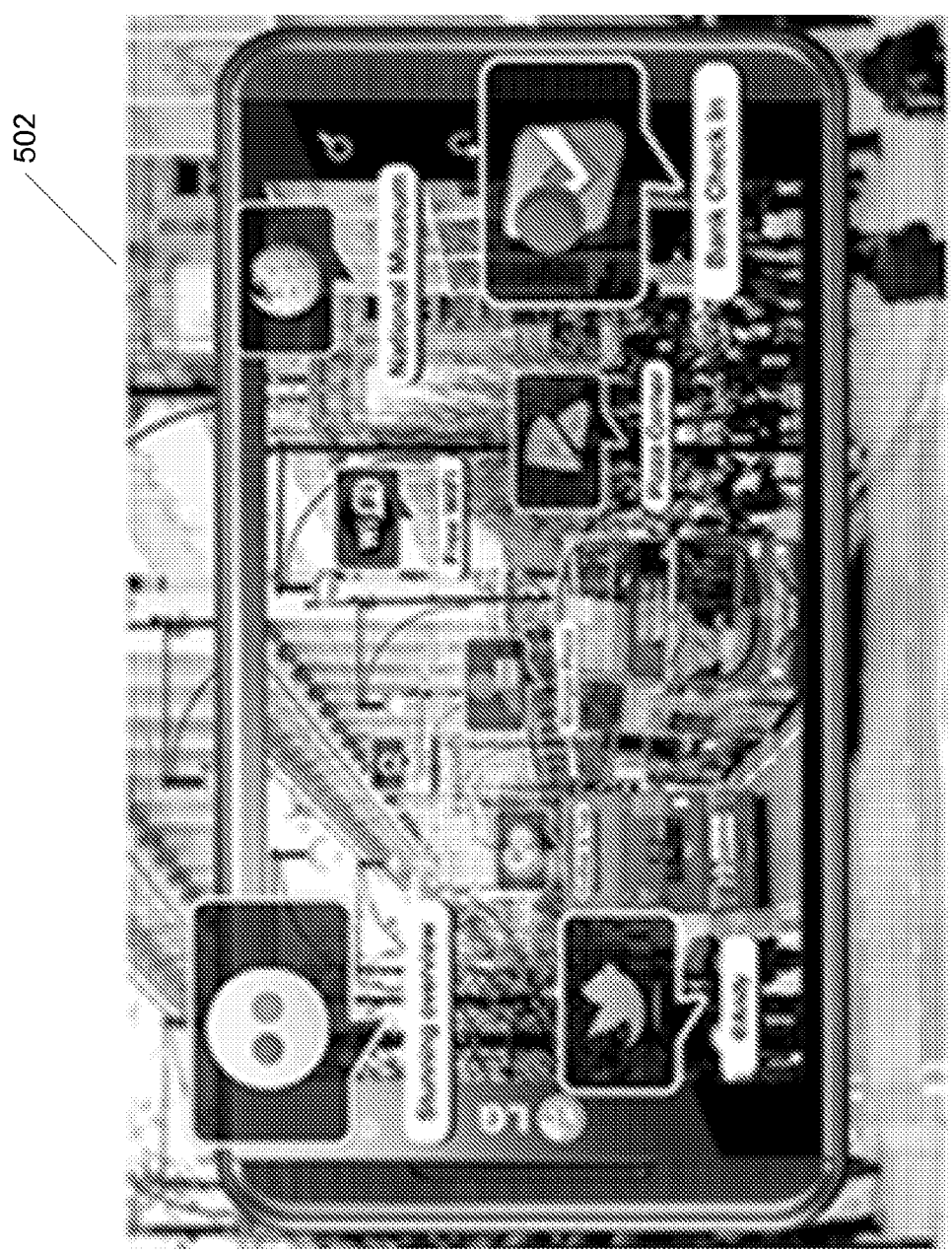
FIGS. 5A, 5B illustrate plots of query time versus database server CPU time for two different queries, according to an embodiment.
Figure 6:
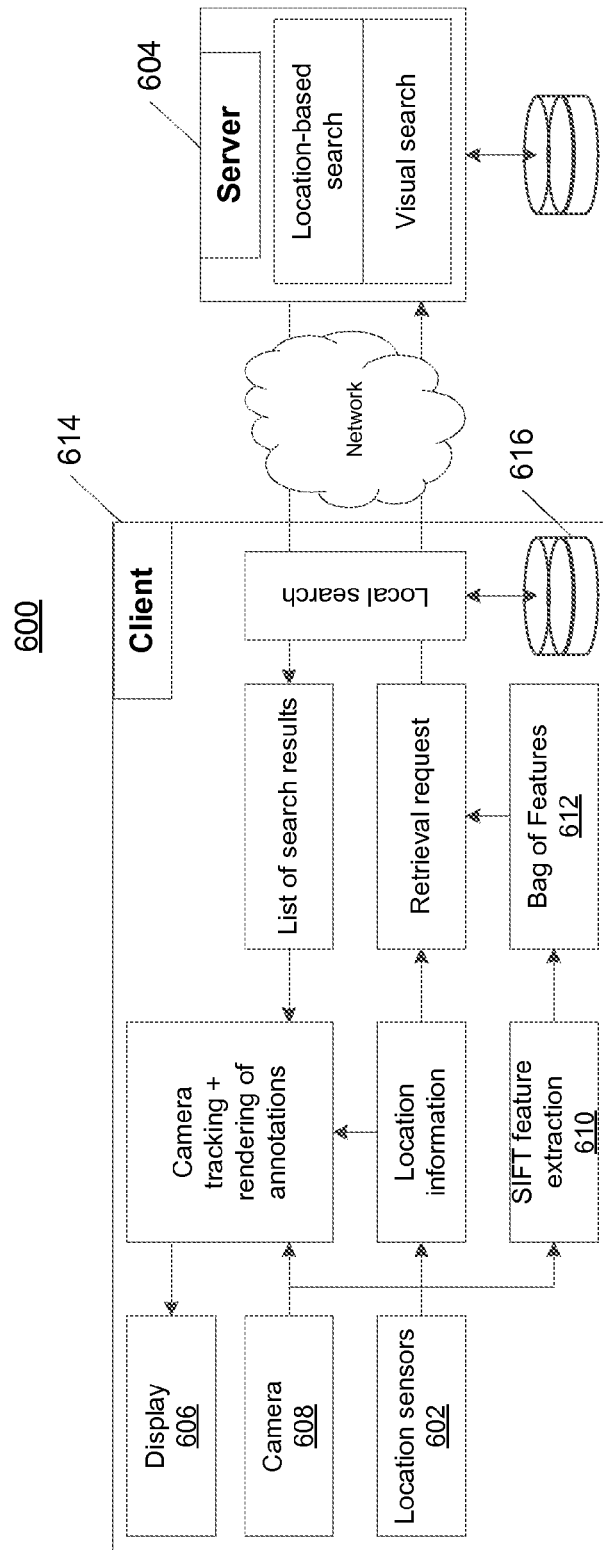
FIG. 6 illustrates a plot of query time versus database server CPU time, according to an embodiment.
Figure 7:
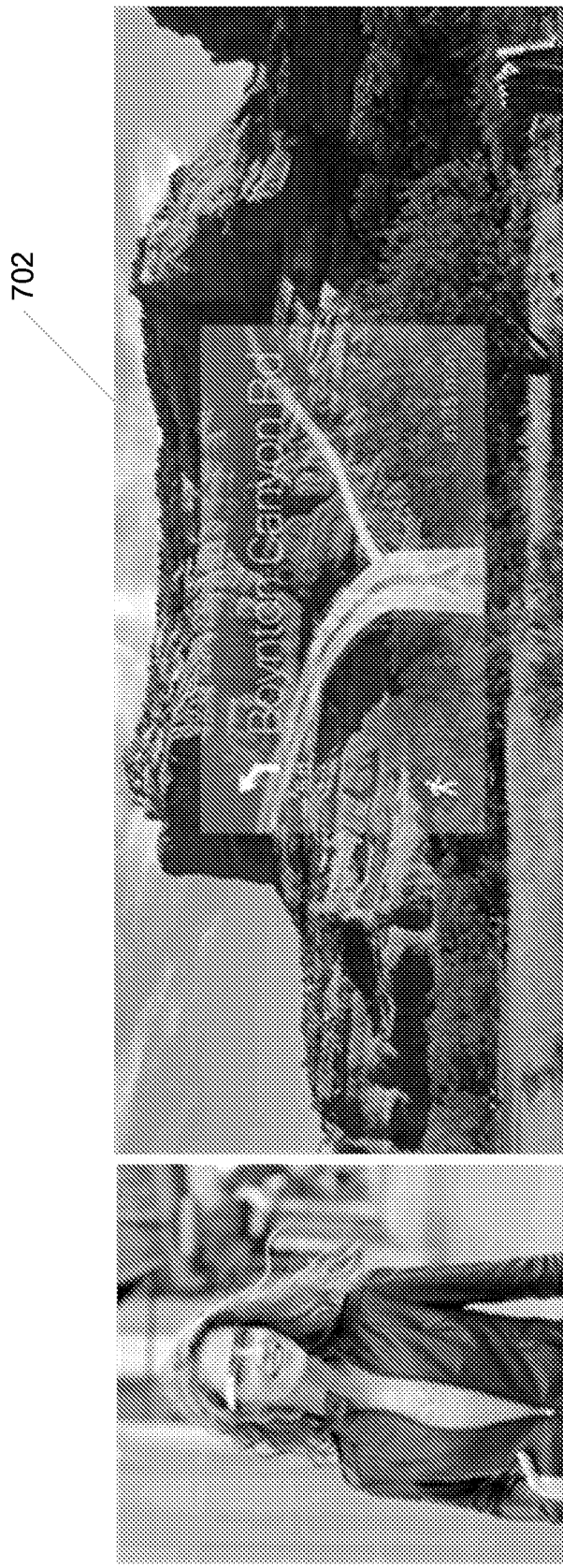
FIGS. 7A, 7B illustrate plots of query execution time versus weighted database server CPU time for the two different queries of FIGS. 5A, 5B respectively, according to an embodiment.
Figure 8:
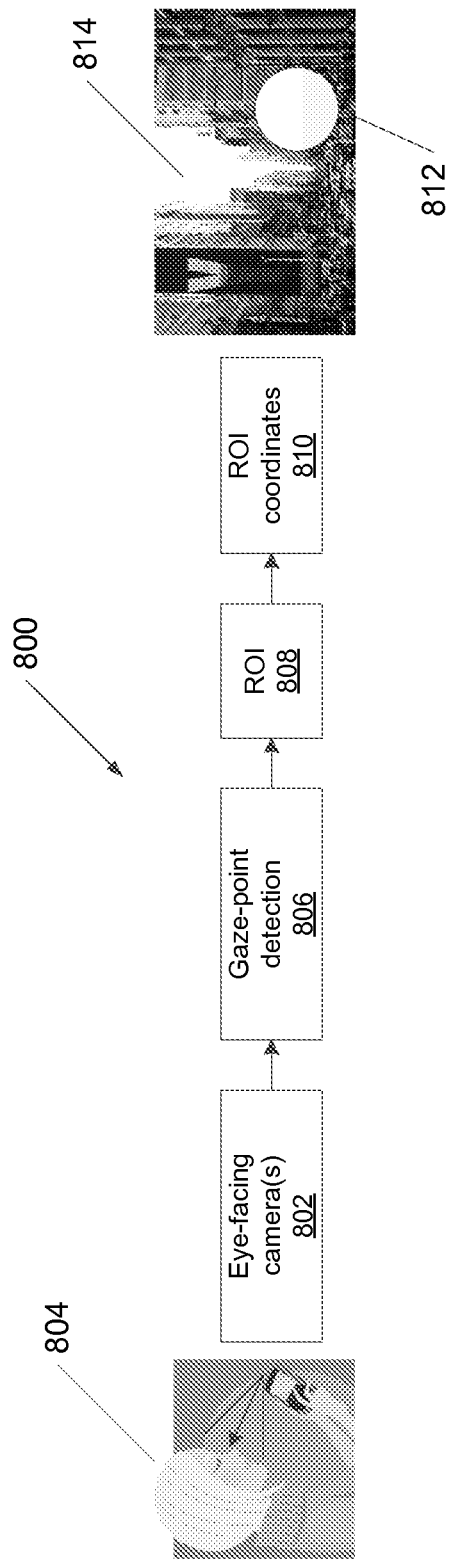
FIGS. 8A, 8B illustrate plots of actual versus predicted database server CPU time for data sets test6 (FIG. 8A) and test7 (FIG. 8B), according to an embodiment.
Figure 9:
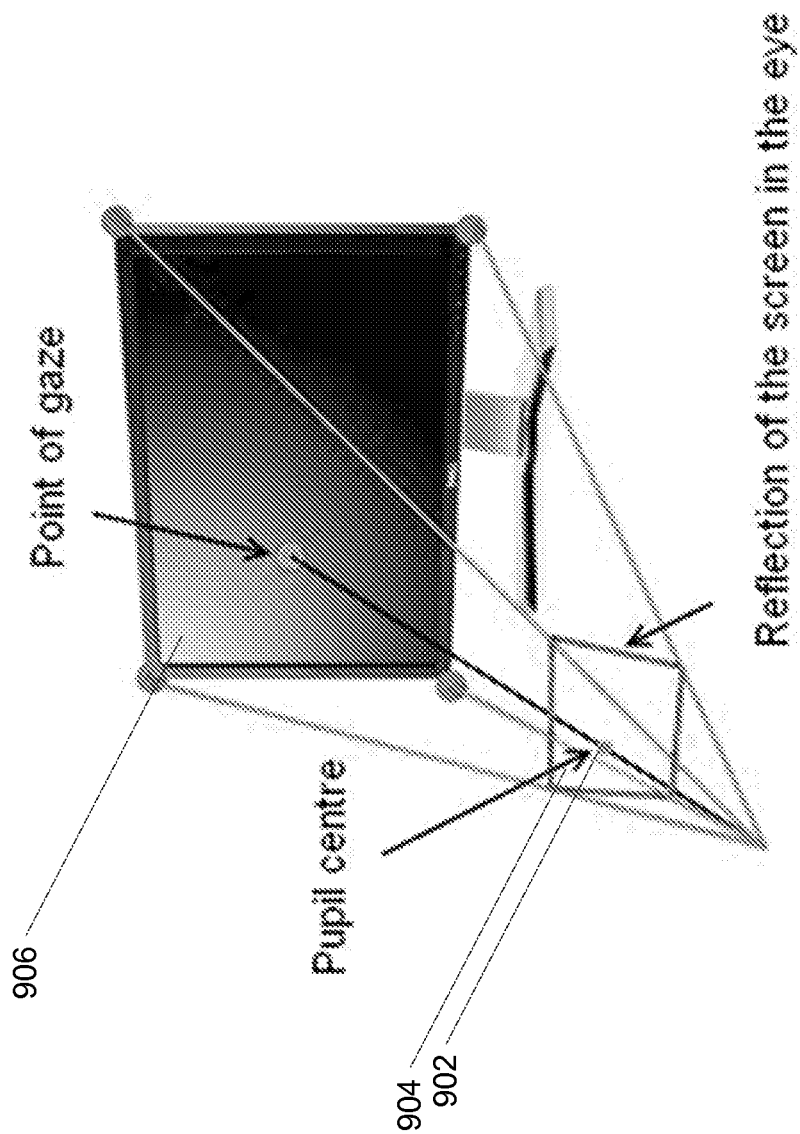
FIGS. 9A, 9B illustrate plots of residual errors as percentages versus sample for data sets test6 (FIG. 9A) and test7 (FIG. 9B), according to an embodiment.

These assumptions and facts lead to the question whether the full complexity and cross-checking of multiple linear regression is really needed, and whether the usual regression technique(s) will try to compute relationships between the wrong things. For ease of explanation, it may be helpful to visualize a sample dataset. Two x-variables, each representing response time for a different class of queries executing simultaneously, for example (XVAR from FIG. 12) from a test6 dataset are illustrated in FIG. 5; the first variable/query class is one of the larger contributors to overall query time, and the second variable/query class is a minority contributor.

FIGS. 5A, 5B plot each of these x-variables against the user CPU time (user_us) consumed by the server. The plots illustrate that the first x-variable is related to the server's CPU consumption, which should be expected because the first query should be responsible for most of the CPU. See FIG. 6 for a plot of the server's CPU time in microseconds. The second variable appears negatively correlated with CPU time, which is unrealistic, improbable, and/or impossible since the overall CPU time consumed by a query over time is additive, and will not decrease. This helps illustrate why variables that physically contribute to CPU time consumption are sometimes omitted from ordinary least-squares regression because they produce "worse" results overall. A human examining such a scatter plot visually might conclude that no relationship exists between the variable and CPU time.

This is not necessarily the case. The apparent negative correlation between the second variable/query response time and CPU time can be just an unfortunate coincidence due to when each query executes. Instead of evaluating the correlations of the independent (e.g., CPU time) and dependent (e.g., query response time) variables, as well as the Cartesian products of all the independent variables and the dependent variable, consider the method defined roughly as follows:

For each sample of dependent and independent variables:
1. Assume that the sum of the independent variables (e.g., see SUM: XVAR[i] calculation in FIG. 12) is wholly responsible for the dependent variable.
2. Divide the latter by the former to obtain a slope, whose meaning and dimension is quantity of dependent variable per quantity of independent variable (see calculation of RATIO[i] in FIG. 12).
3. Multiply each independent variable (e.g., XVAR) by the slope calculated above to obtain an estimate of the dependent variable (e.g., ZVAR of FIG. 12) that should be blamed on it for this sample, i.e., the contribution of the independent variable to the dependent variable. A standard error can also be computed and associated with the estimation as disclosed herein.

This leads to a transformation of the problem: instead of regressing x-variables against the y-variable, one can use simple (single-variable) linear regression on each x-variable's set of values and estimated y-variables independently to determine the best-fit slope and intercept for that class of queries. Simple linear regression is computationally inexpensive, and because the problem has been decomposed into n simple linear regressions, there is no combinatorial explosion on large datasets. Further, because each of these individual regressions is performed against a weighted proportion of the y-variable (i.e., the dependent variable), much of the noisiness of fine-grained samples can be reduced.

Once again referring to the data illustrated in FIGS. 5A-5B, each x-variable against its computed contribution to the y-variable instead of the entire y-variable is plotted. The result is illustrated in FIGS. 7A-7B. The change in methodology now illustrates that each query's execution time has a positive relationship to the portion of CPU assigned. Instead of using the more complex method of ordinary multiple regression, the data and relationships between them is more straightforward.

This and other types of analysis, both numerical and visual, were performed on a variety of sample datasets from real systems (see "Evaluating Results" section below). The following modifications/assumptions were forced to avoid unrealistic and/or improbable results:

1. Non-positive slopes are disallowed. A task/query that runs longer should consume more CPU cycles, not fewer.
2. Positive intercepts are allowed. A task/query may have a relatively fixed startup cost, such as query parsing and planning, and then an incremental cost that is proportional to its execution time. A positive intercept can be an expression of a constant startup cost; a positive slope can express the incremental cost.
3. Queries that are not present in an interval (i.e., where the x-variable is 0) are ignored during that interval, because a query that does not execute does not have a startup cost. Without this modification to the equation, one would assume that a query's startup cost is always present in every time interval, even if the query does not execute in that interval.
4. Queries that have too few samples to perform an ordinary regression (only 1 or 2 samples) can, in some embodiments, be handled with Cartesian geometry.

Evaluating Results

Several principles guided assessment of results and quality. The goal was to use two types of references. First, comparison of the best results achieved against the existing literature and available tools, even though obtaining directly comparable results is challenging. Second, the sample datasets were divided, the weighted linear regression techniques of one portion were trained, and the results were used to try to predict the remainder. This approach can be useful in guarding against over-fitting.

The results can be judged numerically and/or visually. Typically, standard measurements for the quality of regression results center on goodness of fit, standard error, and statistical significance. Goodness of fit is often measured by the correlation coefficient and the $R^2$ value; standard error through error terms and T-statistics for the slope and intercept; and statistical significance via the F-statistic.

These measures are useful and important, but can be difficult to interpret. The results can also conceal important information that is obvious in various types of plots, and can be a signal of a problem or unanswered question. The slope and intercept errors, for example, look like arbitrary numbers at first. The T-statistic is easier to understand because its magnitude is normalized (in regression it is implemented as the coefficient's standard error divided by the coefficient itself). But grasping the fundamental meaning of these measurements requires extensive knowledge; a non-statistician will probably become overwhelmed quickly even with a relatively concise description such as that given by Wolfram MathWorld™ (see http://mathworld.wolfram.com/StandardError.html for a description of standard error), which is incorporated herein by reference in its entirety. It can be meaningful to plot and visualize the results in several ways to look for strange and/or unexplained behavior. When something seemed out of the ordinary, it was examined until it could be explained.

In addition to the above metrics, mean absolute percentage error (MAPE) can be used as a descriptive statistic. This can be accomplished by training the model on a dataset, and then using the result to predict either the training dataset or another dataset from the same system. For each sample in the dataset, the actual error in the prediction is computed, then the mean of the actual errors is computed. This is a metric that some used may find more intuitive (e.g., it indicates the likely relative size of the errors in the regression model).

Benefits of the approaches described herein not only permit one to estimate the relationship between fine-grained measurements of queries and aggregate metrics, but to make the relationships and their strength and quality obvious to human users without advanced degrees in math and statistics. To achieve this, visualizations such as scatter plots with a 1:1 aspect ratio can be employed.

Example 3

As an example, benefits of the approaches described herein can be employed to examine the method's results on the test6 example dataset, and compare it to ordinary least-squares multiple regression with some of the usual descriptive statistics. Two variables are used as examples throughout and can be shown. The following R commands are used:

```
res <- lm(user_us ° ., data-test6)
summary(res)
# some lines omitted
                      Estimate  Std. Erorr  t value  Pr(>|t|)
(Intercept)           2.566e+07 3.641e+06   7.048    5.43e-12  ***
q.6368bf5907564a9f    1.895e+00 5.520e-01   3.434    0.000640  ***
e.786f8ac3c1ea1c93   -1.816e+02 1.882e+02  -0.965    0.334913
Residual standard error: 2199000 on 554 degrees of freedom
Multiple R-squared: 0.9976, Adjusted R-squared: 0.9969
F-statistic: 1416 on 164 and 554 DF, p-value: <2.2e-16
```

One non-limiting description of the result is that the model found a combination of an intercept and slopes for the hyperplane that "explains" 99.76% of the y-variable (user_us). This can be considered a good fit. However, examining individual coefficients shows that many of them are strongly negative, which is unreasonable and/or impossible. Adding constraints such as disallowing negative coefficients and enforcing a zero intercept may be necessary to make the model more realistic. One can conclude that such constraints would worsen the various quality-of-fit metrics, such as the $R^2$ value.

Before proceeding to examining the results of the weighted linear regression method, provided here is a brief description of the results obtained from other methods. In general, many methods were able to produce a "good" fit, usually by discarding all but the most significant variables. The models and results, however, were either physically unrealistic and/or did not meet requirements such as computing a contribution for all queries.

- Given that a result that is directly comparable to the method's results cannot be found, disclosed herein are methods of describing how "good" the method's results are. The following were chosen for their understandability and utility:
- Examine the usual descriptive statistics about each of the per-x-variable regressions, such as the correlation coefficient and the $R^2$ value; standard error through error terms and T-statistics for the slope and intercept; and statistical significance via the F-statistic.
- Examine scatter plots of each x-variable compared to the weighted proportion of the y-variable attributed to that x-variable, as shown earlier.
- Perform the method, and then, for each sample of the x-variables, predict the y-variable and measure the MAPE relative to its actual value.
- Perform the method as above, then perform a linear regression of the predicted versus actual values of the y-variable. A perfect result would have an $R^2$ value of 1, a slope of 1, and an intercept of 0.
- Perform the method as above, then plot the residuals as time series and histograms.
- Perform the method per any of the "perform" steps above, but train on a portion of the dataset and predict against another portion.

The combination of these exercises proved helpful for finding strange or unexplained behavior, and for showing how susceptible the method is to errors such as over-fitting the model to a specific set of inputs.

Example 4

First, perform the weighted linear regression method against the same test dataset as previously employed, and examine the variables mentioned previously. Since multiple independent regressions are performed for each x-variable, each can be examined with the usual statistics, especially the $R^2$ and T-statistic. The results are illustrated in Table 2.

TABLE 2

Descriptive statistics for two per-query weighted regressions

| query | samples | $R^2$ | slope | t value | intercept | t value |
|---|---|---|---|---|---|---|
| q.6368bf5907564a9f | 719 | 0.98 | 3.65 | 0.0054 | -8.345e+05 | 0.98 |
| e.785f8ac3c1ea1c93 | 711 | 0.98 | 3.092 | 0.0053 | 993.4 | 2.12 |

Looking at the first query, 719 time intervals were measured that contained this query, and after regressing its execution time against the CPU time attributed to it, the regression produced an $R^2$ value of 98%. The slope of the fitted line is 3.65, which means that for every second this query executes, it is expected that the database server uses 3.65 seconds of CPU time. That is, the query can use more CPU time than its wall-clock time.

This is realistic for at least two reasons. One is that queries often cause background work inside the database server that happens later and is not easy to attribute to a specific query other than by techniques such as the regression techniques disclosed herein. Another is that the measurement is from the time that the database server receives the entire query, until it sends the first byte back across the network to the client application. Some queries will run longer than this, so in some cases the query's execution time will be underestimated.

The T-statistic for the slope is very small, which is desirable. The intercept is negative, with a high T-statistic; as previously mentioned, negative intercepts can be disregarded. In practice, intercepts have proven to influence results very little overall, even when they are large and/or have a large error term and thus T-statistic. In some embodiments, intercepts can be forced to 0.

The part of this result that can be directly compared to that obtained from R with ordinary multiple linear regression is the slope, which corresponds to the coefficient of the variable. The results are quite different. This can be attributed to ordinary multiple linear regression's unphysical fitting of the model to the data, resulting in negative slopes, among other things. Visually, the results are reasonable (referring again to FIGS. 7A-7B, which plots the query execution times versus the CPU time attributed to them). The slope and intercept of that line are shown in Table 2.

An example listing of the variables and their results is found in Appendix A. Upon examination, nearly all of the variables have good results. That is to say, the plot of the query's time versus the attributed CPU time will be tightly clustered around a diagonal line. This is a much better result than ordinary unconstrained regression, and matches a more intuitive sense of how queries should influence CPU time in the database server.

The next quality check is to use the samples of query execution time to try to predict the corresponding CPU usage. The correct answer is known, so the results can be judged by how closely they match. One way to do this is with the mean absolute percent error (MAPE). In the test dataset, the MAPE is 5.9%. When the method is "trained" on the test6 dataset and the result used to predict the test7 dataset (the two datasets were taken sequentially from a single database server), the result is also a MAPE of 5.9%.

The next quantitative check of the results is to record the predicted and actual values of CPU and perform a simple linear regression, using the actual CPU as the x-variable and the predicted CPU as the y-variable. As previously mentioned, if the results are near perfect, every combination of points in the resulting scatter plot will fall almost exactly along a line through the origin with slope 1, and the $R^2$ will be nearly 1. When training and predicting on the same dataset, a slope of 0.97 is achieved, and the $R^2$ value is 0.96. When training on test6 and predicting on test7, the slope is 1.00 and the $R^2$ is 0.91. Keep in mind that the changes in this database server's load, using one range of time to predict behavior during another is more than satisfactory.

The results just mentioned can be easier to assess visually than numerically, which leads to the next quality control technique. The plots in FIGS. 8A, 8B show the actual versus predicted CPU samples for the two cases. The diagonal lines indicate where a perfect match would lie. These plots are essentially residuals on a diagonal line. One might choose to display the residuals in this fashion instead of just plotting the actual value of CPU on the x axis and the residual on the y axis because it becomes difficult to assess the relative magnitude of the residuals, especially since most plotting libraries will set the y axis range relative to the magnitudes. Plotting actual versus predicted values and setting the aspect ratio to 1:1 makes the values and their relative magnitudes obvious to the eye.

The value of the plot in general is the ability to instantly observe outlying points such as the lone outlier near the top of FIG. 8A. These plots also help understand the results and their quality: quite good in the first case (FIG. 8A); more dispersed in the second case (FIG. 8B) as expected (and as shown by the lower $R^2$), but still generally good. They also give additional context to numbers such as the MAPE showed earlier: although both cases have the same MAPE, it is clear that MAPE does not fully characterize the results.

These plots omit the time dimension, which is important to examine, so the residuals are plotted as a time series, as previously mentioned. Residuals themselves, however, are difficult to put into context. For example, it can be difficult to tell if a residual of 198.3 is bad. Similarly, it can be difficult to tell if a residual of 1.5811e+08 is bad. Because a straightforward plot of residuals omits the magnitude of the values themselves, there is no way to know. It is much more helpful to display the relative residuals; thus, as shown in FIGS. 7A, 7B, these are plotted as percentages.

Finally, because one would like to know how the errors are distributed, the residual percentages are plotted as histograms in FIG. 10.

The following aspects can affect operation and should be kept in mind:

When performing the regression against dependent variables other than CPU time, it can be useful to think about whether there is truly a causal relationship between query execution time and that variable. Sometimes the answer is not obvious, and the results can be inspected. Sometimes there is no relationship, a weak relationship, or a non-linear relationship. A case in point is the metric of rows sorted in the MySQL database server. Depending on the query execution plan, queries that run a long time may do so because of sorting many rows—but in other cases, the long time may be due to other work, and sorting rows is a small and fixed portion of the execution time.

The model assumes that the resource consumption is accounted for by what is measured. For example, some queries might be executing in the server in ways that are not measured, such as replication threads in the MySQL server. This can skew the results, produce worse fits, and should be kept in mind.

In some embodiments, query execution time is measured as time to first byte. Due to this, queries can be counted as complete while they are still executing. This can skew the true query execution time and the results of the regression.

Particularly noisy or chaotic server behavior, or changes in server behavior during the observation interval (such as a change in server settings) sometimes produces poor results.

Aspects of the approaches described herein overcome deficiencies in the prior art, where it is infeasible and undesirable to measure, transmit, store, and analyze the Cartesian product of the dimensions of interest in managed systems, for a variety of reasons including performance overhead and cost. Many things of interest are not instrumented in the desired way, and either cannot be so instrumented or would produce misleading results. As previously mentioned, CPU per query is an example of misleading results because some queries cause the server to perform work indirectly, which can be discovered through techniques as disclosed herein. The regression techniques disclosed herein permit interactive inspection of the relationship between arbitrary groups of metrics.

Figure 11B:
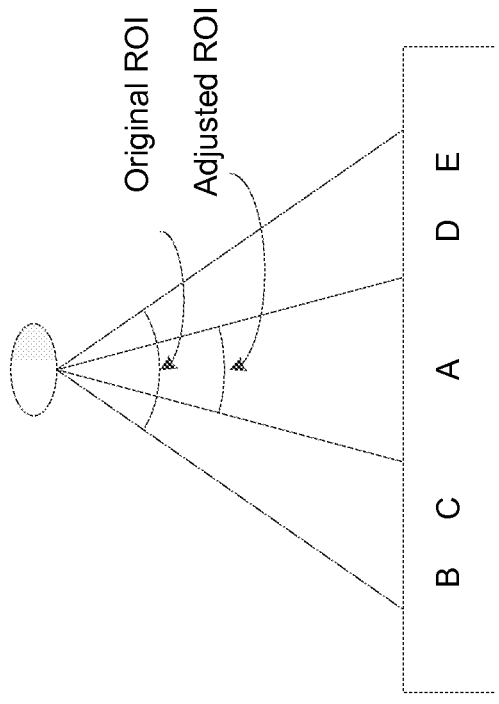
FIG. 11 is an illustration of the user interface of FIG. 4, showing how, in some cases, query execution/response time and CPU time consumption do not always match.
Figure 11A:
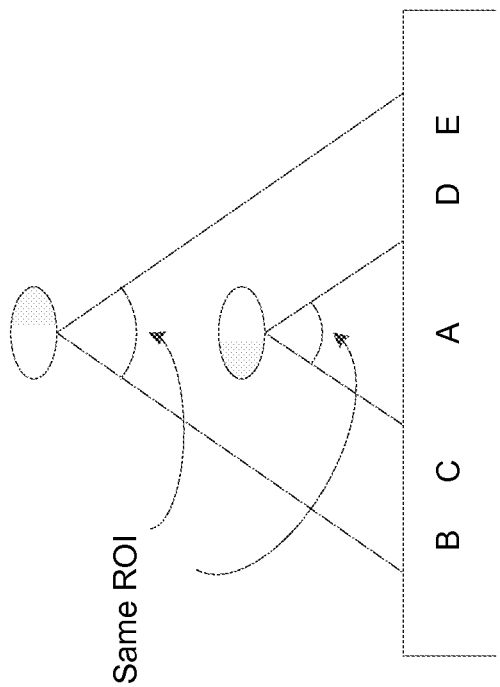

Aspects of the techniques disclosed herein can be beneficial for vetting supposedly intuitive aspects of system performance. For example, if it is assumed that most queries consume about the same amount of CPU time per second of execution time, why not just blame the longest-running queries for the CPU consumption on the server? This is a good intuition, but it turns out not to be true, as shown in FIG. 11, which is similar to FIG. 4 with the CPU column computed with weighted linear regression.

Aspects of the techniques disclosed herein have additional applications, such as with regards to logistic regression. We consider it likely that some types of relationships will be better modeled by a logistic function than a linear relationship. The techniques described herein are also extendible to use ensembles or to automatically choose the best approach from a set of possibilities.

Example 5

Figure 12:
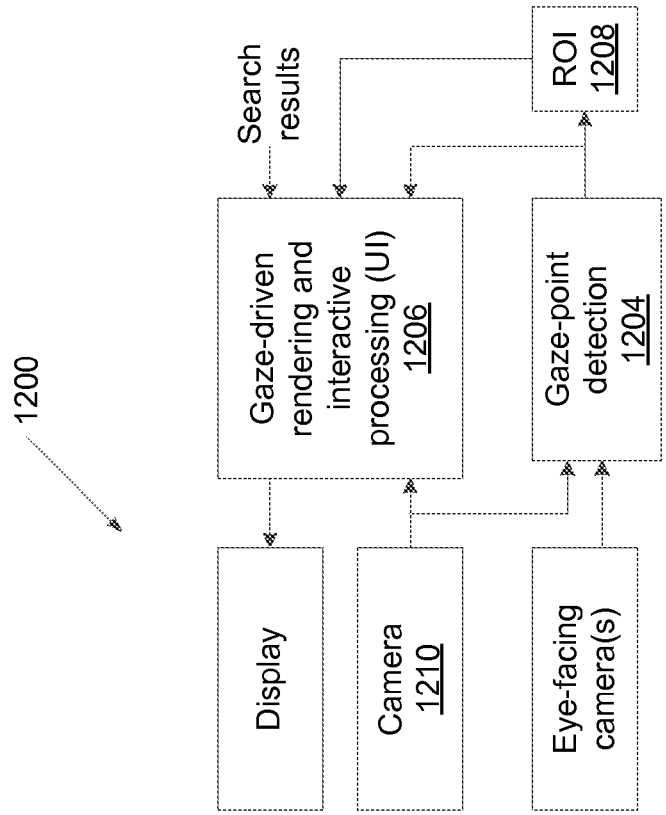
FIG. 12 illustrates an exemplary environment within which aspects of the methods and techniques disclosed herein can be implemented, according to an embodiment.
Figure 12:
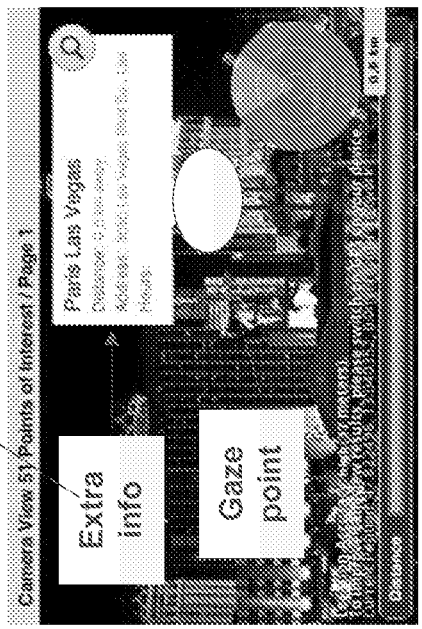

FIG. 12 illustrates an example of an environment within which aspects of the methods and techniques disclosed herein can be implemented. Note that in FIG. 12, a rectangle represents a value, a rectangle with a diagonal line in the upper right corner represents a calculation, a diamond represents a decision and an oval represents an iterative process. Thus, for example, if a rectangle proceeds a rectangle with a diagonal line in the upper right corner, the rectangle includes a value associated with a result of the calculation.

A host device 1000, such as a database server and/or the processing system 290, generates variables YVAR and XVAR that are monitored by a collection and computation device 1020 (hereon, "the computation device"). As a non-limiting example, YVAR can be associated with CPU time for executing 'n' queries, and XVAR can be associated with query response time for a given query, calculated using timestamp information, system time, and/or the like. In other embodiments, YVAR can be associated with the number of input/output operations for executing 'n' queries, and/or any other suitable metric.

In some embodiments, the computation device 1020 (similar to the device 200) is operable to monitor the host device 1000. For each sample YVAR of samples YVAR 1 . . . m (e.g., taken over a predetermined time period such as one day, ½ day, one week, etc.), the x-variables XVAR 1 . . . n are summed (SUM: XVAR[i] 1 . . . n) to produce a total query time (SUMX[i]). If the YVAR[i] is zero or the SUMX[i] is zero, the process is stopped. After such various checks/constraints, the y-variable YVAR is divided by this sum (DIV: YVAR[i]/SUMX[i]) to obtain a ratio (RATIO[i]). In embodiments where YVAR is associated with CPU time, XVAR can be representative of the system time spent on the query, and the ratio can provide information on the average CPU time per unit response time for the query.

Each x-variable XVAR 1 . . . n is multiplied by the ratio (MUL:XVAR[j]*RATIO[i]) to generate 1 . . . n new variables, referred to in FIG. 10 as z-variables (ZVAR[j]). Each x-variable (XVAR[j]) now has a corresponding z-variable ZVAR[j], for each value of YVAR. In this manner, multiple XVAR[j]-ZVAR[j] pairs are calculated, one for each of the samples YVAR 1 . . . m. Then, several 1 . . . n small regressions are computed, where each regression is a simple regression of one x-variable XVAR[j] against its corresponding z-variable ZVAR[j]. This simple regression can produce a slope (SLOPE[j]) and intercept (ICEPT[J]) for each dimension, along with an estimated standard error for the slope (SLOPERR[j]) and intercept (ICEPTERR[j]). The regression can also produce a count number corresponding to the number of nonzero samples of XVAR[j].

In some embodiments, the computation device can function as follows for each sample of YVAR and $XVAR_{1...n}$:

1. Assume that $SUM:XVAR[i]_{1...n}$ is wholly responsible for YVAR.

2. Divide YVAR by $SUM:XVAR[i]_{1...n}$ to obtain a slope/ratio, whose meaning and dimension is quantity of YVAR (e.g. CPU time) per quantity of $SUM:XVAR[i]_{1...n}$ (e.g. sum of response times).

3. Multiply each independent variable (e.g., $XVAR[i]_{1...n}$) associated with a query by the slope calculated above to obtain an estimate of a dependent variable ZVAR that reflects the quantity of YVAR that should be blamed on the query associated with $XVAR[i]_{1...n}$.

The host device 1000 can be in communication with the computation device 1020 as indicated by solid lines in FIG. 12 via, for example, one or more networks, each of which can be any type of network such as, for example, a local area network (LAN), a wide area network (WAN), a virtual network, a telecommunications network, and/or the Internet, implemented as a wired network and/or a wireless network. In some embodiments, communications can be secured (e.g., encrypted) or unsecured. The host device 1000 and/or the computation device 1020 can be a personal computer, a server, a work station, a tablet, a mobile device, a cloud computing environment, an application or a module running on any of these platforms, and/or the like.

Example 6

Appendix B illustrates example code, according to embodiments, for implementing aspects of the approach(es) disclosed herein.

Referring again to FIG. 2, in some embodiments, each of the device 200 and the processing system 290 includes at least a processor (not shown) and a memory (not shown). The memory in each device can independently be, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory can store instructions to cause the processor to execute modules, processes and/or functions associated with a device, i.e., the device 200 and/or the processing system 290.

The processor can be, for example, a general purpose processor, a Field Programmable Gate Array (FPGA), an Application Specific Integrated Circuit (ASIC), a Digital Signal Processor (DSP), and/or the like. The processor can be configured to run and/or execute application processes and/or other modules, processes and/or functions associated with the device 200 and/or the processing system 290.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, .NET, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

What is claimed is:

1. An apparatus, comprising:
a data collection module implemented in at least one of a memory or a processing device, the data collection module configured to:
receive, from a processing system configured to communicate with the processing device over a communication network, a first observation value for a dependent first variable, the first observation value associated with a performance of the processing system including processing time or processor utilization during a time period; and receive a set of second observations values for an independent second variable, the set of second observation values associated with processing of a set of tasks by the processing system during the time period as indicated by timestamp information;

a compute module operatively coupled to the data collection module, the compute module configured to:

represent the first observation value as a linear combination of the second observation values;

compute, based on (1) the first observation value and (2) the set of second observation values, a coefficient for forming the linear combination of the second observation values;

multiply the coefficient with each second observation value to generate a set of third values indicative of the performance of the processing system and that represent terms of the linear combination; and estimate using a statistical analysis, based on (1) each third value, (2) the corresponding second observation value, and (3) the representation of the first observation value as the linear combination of the second observation values, a contribution, to the first observation value, of the corresponding second observation value, including computing an estimated error associated with the contribution; and a user interface module operatively coupled to the compute module, the user interface module configured to transmit an indication of the contribution and an indication of the estimated error to a user interface.

2. The apparatus of claim 1, wherein the using the statistical analysis includes identifying a relationship between the third values and its corresponding second observation value associated with tasks executing during the time period.

3. The apparatus of claim 1, wherein the first observation value and each second observation value from the set of second observation values are measures of a common quantity.

4. The apparatus of claim 1, wherein the first observation value is an indication of the processing time, and each second observation from the set of second observation values is an indication of response time.

5. The apparatus of claim 1, wherein the indication of the contribution includes a specification of a slope, or an intercept, or both.

6. The apparatus of claim 1, wherein the indication of the estimated error includes a specification of an estimated error for the slope, or an estimated error for the intercept, or both.

7. The apparatus of claim 1, wherein the indication of the estimated error includes a specification of a mean absolute percentage error (MAPE).

8. The apparatus of claim 1, further comprising a training module operatively coupled to the compute module, the training module configured to train the compute module using a training data set.

9. A computer implemented method, comprising:

at a processing device having a memory:

receiving, from a processing system configured to communicate with the processing device over a communication network, a first observation value for a dependent first variable, the first observation value associated with a performance of the processing system including a processing time or processor utilization during a time period;

receiving a set of second observations values for an independent second variable, the set of second observation values associated with the processing of a set of tasks by the processing system during the time period as indicated by timestamp information;

representing the first observation value as a linear combination of the second observation values;

computing, based on (1) the first observation value and (2) the set of second observation values, a coefficient for forming the linear combination of the second observation values;

multiplying the coefficient with each second observation value to generate a set of third values indicative of the performance of the processing system and that represent terms of the linear combination;

estimating using a statistical analysis, based on (1) each third value, (2) the corresponding second observation value, and (3) the representation of the first observation value as the linear combination of the second observation values, a contribution, to the first observation value, of the corresponding second observation value, including computing an estimated error associated with the contribution; and transmitting an indication of the contribution and the estimated error.

10. The method of claim 9, wherein the using the statistical analyses includes identifying a relationship between each third value and the corresponding second observation value.

11. The method of claim 10, wherein the statistical analyses includes linear regression.

12. The method of claim 9, wherein the corresponding second observation value is associated with a subset of tasks of the set of tasks, such that the contribution is indicative of the performance of the processing system in processing the subset of tasks.

13. The method of claim 9, wherein the corresponding second observation value is associated with a subset of tasks of the set of tasks, such that the contribution is indicative of the performance of the processing system in processing the subset of tasks, the method further comprising:

calculating a per task contribution to the first observation value of the subset of tasks.

14. The method of claim 9, wherein the first observation value and each second observation value from the set of second observation values are measures of a common quantity.

15. The method of claim 9, wherein the first observation value is an indication of the processing time, and each second observation value from the set of second observation values is an indication of response time.

16. The method of claim 9, wherein the set of second observation values includes a training set of second observation values, the method further comprising:

training on the training set of second observation values.

17. The method of claim 9, wherein the transmitting the indication including transmitting a visual representation of the contribution and the estimated error to a user interface.

* * * * *